United States Patent [19]
Prugh

[11] 3,836,844
[45] Sept. 17, 1974

[54] SAFETY TESTER FOR ELECTRICAL APPLIANCES AND RECEPTACLES

[76] Inventor: Richard W. Prugh, 24 Ivy Ln., Glen Mills, Pa. 19342

[22] Filed: May 17, 1973

[21] Appl. No.: 361,125

[52] U.S. Cl. .................... 324/51, 324/66, 324/133
[51] Int. Cl. .................... G01r 31/02, G01r 19/14
[58] Field of Search ...... 324/51, 66, 133; 317/18 A, 317/18 D; 340/255

[56] References Cited
UNITED STATES PATENTS

| | | | |
|---|---|---|---|
| 3,141,128 | 7/1964 | Behr | 324/51 |
| 3,181,060 | 4/1965 | Hull | 324/51 |
| 3,343,154 | 9/1967 | Seesselberg | 340/255 |
| 3,345,565 | 10/1967 | Cotter | 324/51 |
| 3,405,357 | 10/1968 | Thompson | 324/51 |
| 3,663,939 | 5/1972 | Olsson | 324/51 X |
| 3,668,518 | 6/1972 | Shapiro | 324/66 X |
| 3,723,863 | 3/1973 | Myers | 324/51 |
| 3,798,540 | 3/1974 | Darden et al. | 324/51 |

*Primary Examiner*—Gerard R. Strecker

[57] ABSTRACT

A simple, portable, handy tester for simultaneously testing electrical appliances to assure that the grounding system has continuity and to insure that power wiring is adequately insulated from exposed metal parts. The device may also be used to insure that receptacles for appliances are properly wired.

10 Claims, 2 Drawing Figures

PATENTED SEP 17 1974 3,836,844

SAFETY TESTER FOR ELECTRICAL APPLIANCES AND RECEPTACLES

BACKGROUND OF THE INVENTION

The safety of electrical appliances depends primarily on adequate insulation between the power wiring and exposed metal parts, and secondarily on an adequate electrical path to ground, if the power-wiring insulation should fail. In order for the electrical path to be complete, the power wiring and a grounding conductor must be properly wired in each power receptacle. It is possible for trained personnel to make these insulation-resistance, ground-continuity, and receptacle-polarity tests using a combination voltmeter and ohmmeter, and then interpret the results to identify a safe condition or any deficiencies. To obviate the need for training and interpretation, sophisticated, bulky and expensive testers have been developed and are commercially available to make the ground and insulation tests automatically. Polarity testers also are available, but require cumbersome interpretation. Examples of these testers are shown in U.S. Pat. Nos. 3,643,157; 3,611,133; 3,533,581; 3,368,146; 3,141,128; and 2,806,993.

On the other hand, simple lightweight continuity testers employing an incandescent bulb and a flashlight cell are commercially available. Testers of this type are illustrated by U.S. Pat. Nos. 3,317,825 and 3,383,588. Although these testers could be used to check ground continuity and insulation resistance, only a narrow (and unsafe) range of resistances is measured. For example, in such devices, a grounding-circuit resistance too high to be safe (above 10 ohms) would indicate "safe" and an insulation resistance in the range 100 to 1000 ohms would indicate "safe" (no light) even though insulation leakage of this magnitude would be unsafe. In addition, fail safe features are lacking in the prior art devices, and multiple tests, single light indicating means are not provided.

The U.S. Pat. No. 3,668,518 discloses a receptacle test instrument utilizing a bridge circuit as does the present invention. Again, however, the device requires the use of meter means for interpreting the nature of the defect.

Yet another drawback regarding many prior art testers is the fact that the insulation test is conducted only through the neutral power conductor. Thus, a fault or leakage between the hot conductor and the frame of the appliance, if upstream of the appliance ON/OFF switch, will not be detected. Prior art devices do not provide a connection between the hot and neutral terminals for permitting leakage in either to indicate an unsafe condition.

SUMMARY OF THE INVENTION

The present invention relates to a small, simple, handy, portable tester into which an electrical appliance can be plugged directly. The grounding prong of a male plug on the opposite end of the tester is used as a probe to contact exposed metal parts on the appliance. The test circuit is energized by pressing a pushbutton, and adequate ground continuity and insulation resistance is indicated by lighting of a semiconductor lamp. For testing receptacles, the probe end of the tester is inserted into the receptacle, and proper wiring is indicated by lighting of a single neon lamp. While the tester is plugged into a properly wired receptacle, the battery used for appliance testing is charged. Both aspects of testing are "fail safe"; that is, failure of an indicator lamp to light indicates a defective test or a defective appliance or receptacle.

Accordingly, the object of this invention is to provide safety inspectors, shop attendants, or prospective users of electrical equipment with a test device which is small, handy, lightweight, inexpensive, with a long service life, and easy to use, to identify unsafe electrical equipment. This device would indicate unsafe conditions, such as grounding circuit resistance above a few ohms or insulation resistance less than a few thousand ohms or improper receptacle wiring, by failure of a test lamp to light. This device is also "fail safe"; that is, failure of the test light to light—through damage, deterioration, burned-out lamp, or a dead battery—would indicate an unsafe condition. In order for the test lamp to light, all parts of the test equipment and tested equipment must be in good condition.

Another object of this invention is to provide the inspector or prospective user of electrical equipment with a tester which is self-contained and compact, which does not require replacement of a battery. This is accomplished by incorporating a rechargeable battery and a charging circuit in the tester— a combination which allows upwards of a hundred tests between charging, with an overnight charging period.

A further object of the invention is to provide an electrical equipment tester which requires a minimum skill for use or in interpretation of test results. The device of this invention requires no reading or interpolation of meter scales and no interpretation of lamp intensities or colors. This is accomplished by using a semiconductor switch and a neon lamp, both of which have very sharp ON/OFF characteristics. If either the polarity-test lamp or the appliance-test lamp fails to light, an unsafe condition is indicated. If the appropriate lamp lights, the equipment is in good condition—there are no intermediate indications.

BRIEF DESCRIPTION OF THE DRAWINGS

The foregoing and other objects of this invention will be more apparent from the following specification, taken in conjunction with FIGS. 1 and 2, forming a part thereof, wherein.

DESCRIPTION OF THE PREFERRED EMBODIMENTS

Appliance Testing

Figure 1:
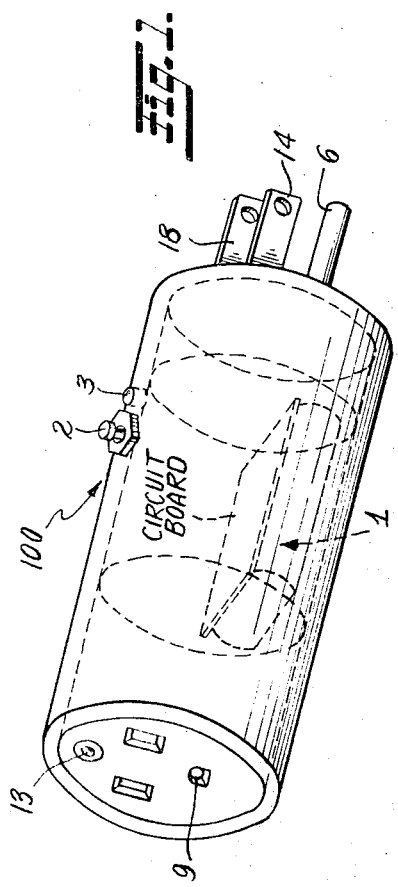
FIG. 1 shows a perspective view of the external parts of the tester.
Figure 2:
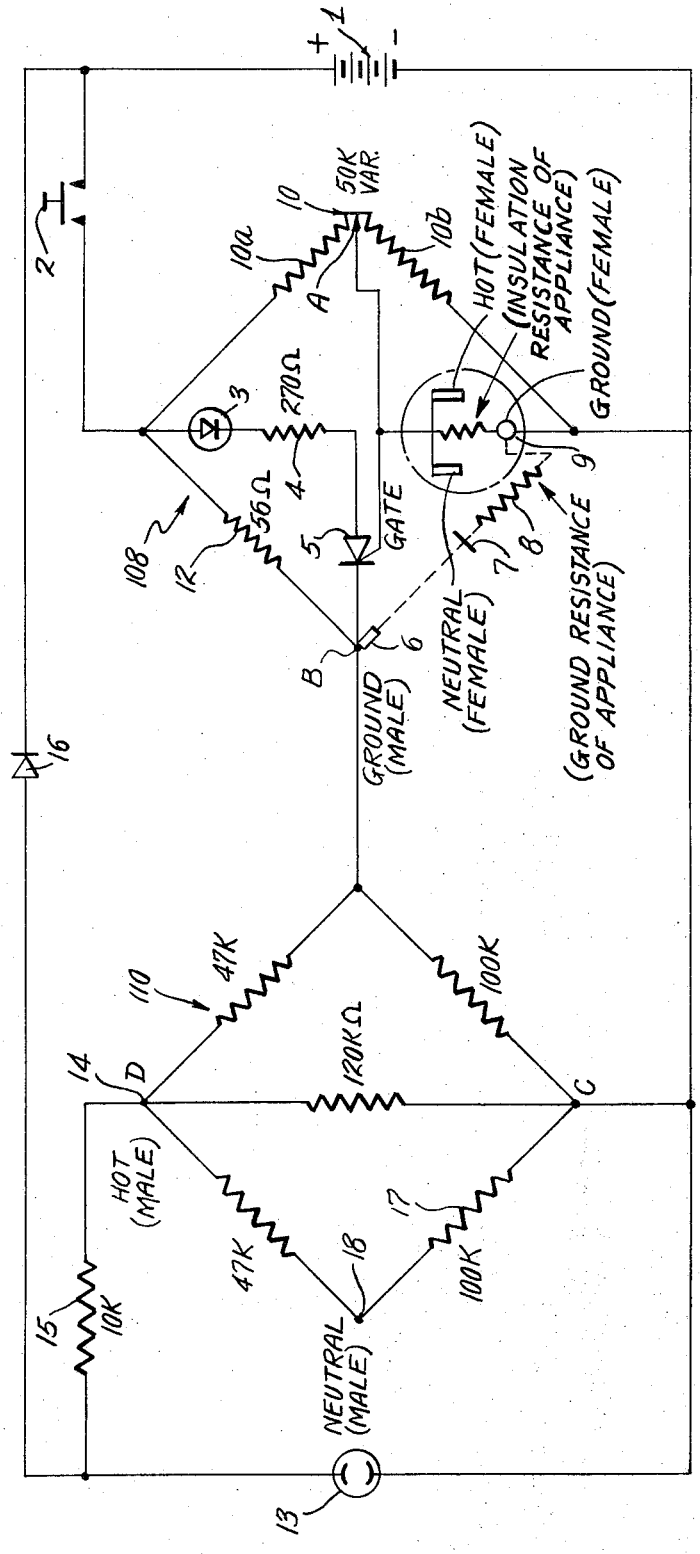
FIG. 2 is a schematic wiring diagram of the tester, showing all of the essential parts.

The tester 100 is illustrated in FIG. 1, the circuit details are shown in FIG. 2. The insulation and ground testing utilize a bridge circuit 108 and the receptacle testing (polarity, etc.) utilizes a receptacle bridge circuit 110.

When testing an appliance which is in good condition, current flows from a battery 1, through a pushbutton 2, a first indicating means 3, such as a light-emitting diode (causing it to light), through a current-limiting resistor 4, a switching element 5, such as a silicon-controlled rectifier, to a probe means 6 which may be a ground-pin probe on a male-plug such as shown at the end of the tester. From the probe means 6, current flows to the exposed metal parts of the appliance which is represented at 7, through grounding wire of the appliance and the grounding prong of the appliance under test (the ground resistance of the appliance is represented by 8) into ground connection means 9, the ground-prong receptacle, of female-receptacle means 5 of the tester, and thence to the negative pole of the battery 1. The electric path through the appliance under test is shown by the dotted lines.

When the pushbutton 2 is depressed, current also flows through the variable bridge and voltage-limiting resistance 10, made up of resistances 10a and 10b, so that a voltage of approximately one-sixth of the battery voltage appears at point A and at the gate of the silicon controlled rectifier 5, causing it to conduct. However, if the resistance within the appliance between the power wiring and (1) the exposed metal parts or (2) the grounding wire (this resistance labelled "insulation resistance of appliance") is too low, the voltage across the voltage-limiting resistor 10b will not be adequate to cause conductance in the silicon controlled rectifier 5, and the light-emitting diode 3 will not light.

When the pushbutton 2 is depressed, current also flows throught the bridge resistor 12, through the ground-pin probe 6, to the exposed metal parts of the appliance 7, and through the appliance grounding system 8 to the female ground connection means 9. If the resistance in the grounding system 8 is too great, the voltage at point B may be equal to, or greater than, the voltage at point A, and the silicon controlled rectifier 5 will not conduct nor will the light-emitting diode 3 light.

The values of the bridge resistors 10 and 12 are selected so that unsafe values of ground resistance and insulation resistance will prevent conduction in the silicon controlled rectifier 5, and the light emitting diode 3 will not light.

Receptacle Testing

The receptacle tester utilizes a receptacle bridge circuit 110. When the male end of the tester 100 is plugged into a properly-wired receptacle, the voltage at point C will be low enough, relative to the voltage on the hot terminal D, to cause a second indicating means 13, such as a neon lamp, to light. If either or both the neutral and ground terminals in the receptacle are "hot," or if the ground terminal in the receptacle is not connected to ground, the voltage at point C will be high, relative to the voltage on the "hot" terminal D, and the neon lamp 13 will not light. There are 64 ways in which a receptacle can be wired or left unwired, and only one of these arrangements is correct. Three of the arrangements are improper, but are only marginally unsafe (reversal of neutral and ground). Of the 60 unsafe arrangements, 58 would result in "no light" (unsafe) with the present invention (97 percent accurate). The other two unsafe conditions would result from connection of the hot power wire to both the ground and neutral terminals and (1) connecting the ground wire to the hot terminal or (2) connecting the neutral wire to the hot terminal. It is extremely unlikely that these two combinations of incorrect wiring would be encountered during tests, either as a result of accident or deliberate miswiring. Also, these two combinations cannot be identified with any type of plug-in tester which does not refer to an external ground, such as a water pipe.

Both the silicon controlled rectifier 5 and the neon lamp 13 have relatively sharp ON/OFF characteristics, so that the appliance and receptacle tests are esentially GO/NO-GO tests and require no interpretation. If the indicator lamp lights, the device is safe; if the lamp does not light, an electrician should identify and correct the deficiency. The device is fail-safe in that the failure of an indicating means to be actuated signifies either a faulty appliance, receptacle or indicating means.

The 9-volt rechargeable battery 1 is charged and recharged by plugging the male plug means of the tester into a properly-wired receptacle. Charging current flows from a "hot" prong 14 through a current-limiting resistor 15, through rectifying means 16, such as a diode rectifier to the positive terminal of the battery 1. The circuit is completed from the negative terminal of the battery 1, through a resistor 17 which forms a part of the polarity testing circuitry, to a neutral prong 18.

I claim:

1. A portable device for testing electrical characteristics of appliances having exposed metallic parts and three male prongs, said device comprising:
   a. a housing member,
   b. power source connecting means having two terminal leads,
   c. a bridge circuit contained in the housing member, said bridge circuit having a first bridge terminal for connecting a first and second bridge arm to one power source terminal lead, a second bridge terminal connecting a third bridge arm to said second bridge arm, a third bridge terminal connecting the third bridge arm to the other power source terminal lead, and a fourth bridge terminal terminating one end of said first bridge arm, said bridge circuit comprising:
      1. electrical resistance means in said first, second and third bridge arms,
      2. a controllable switching element connected between said first and fourth bridge terminals, said controllable switching element having a control terminal,
      3. electrical indication means connected in series with said controllable switching element,
      4. means for connecting the control terminal of the controllable switching element to said second bridge terminal,
      5. said controllable switching element actuated when the voltage at said second bridge terminal is greater than the voltage at said fourth bridge terminal,
      6. means for connecting male line prongs of the appliance under test to said second bridge terminal,
      7. means for connecting a male ground prong of the appliance under test to the third bridge terminal, thereby controlling the voltage of said control terminal in response to low insulation resistance between said male line prongs and said male ground prong, and
      8. probe means connected to said fourth bridge terminal for connection to said exposed metallic parts of said appliance under test for controlling the voltage at said fourth bridge terminal in response to the appliance ground resistance between said exposed metallic parts and said male ground prong, whereby said indication means is actuated only upon a satisfactory insulation resistance test and a ground continuity test.

2. Apparatus as recited in claim 1 wherein said electrical resistance means in said second and third bridge arms comprises a single variable resistive means.

3. Apparatus as recited in claim 2 wherein said controllable switching element is a silicon controlled rectifier.

4. Apparatus as recited in claim 1 wherein said indication means is positioned between said controllable switching element and said first bridge terminal.

5. Apparatus as recited in claim 1 wherein said means for connecting said male line prongs and said male ground prong comprises three prong female receptacle means.

6. Apparatus as recited in claim 5 wherein said female receptacle means for receiving said male line prongs are electrically connected.

7. Apparatus as recited in claim 1 further comprising a second bridge circuit for testing the polarity of a receptacle.

8. Apparatus as recited in claim 7 further comprising male plug means attached to said housing member having hot, neutral and ground prongs for insertion into a receptacle, said probe means comprising said neutral ground prong.

9. Apparatus as recited in claim 8 further comprising a battery housed in said housing member and connected to said two terminal leads.

10. Apparatus as recited in claim 9 further comprising rectifying means between said second bridge circuit and said battery whereby said battery is charged upon inserting said male plug means into a correctly wired receptacle.

* * * * *